United States Patent
Treyer et al.

(10) Patent No.: US 9,002,203 B2
(45) Date of Patent: Apr. 7, 2015

(54) DATA PROCESSING OF AN OPTICAL NETWORK ELEMENT

(75) Inventors: Thomas Treyer, Munich (DE); Karl Kloppe, München (DE); Harald Rohde, Munich (DE)

(73) Assignee: Xieon Networks S.a.r.l., Luxemburg (LU)

(*) Notice: Subject to any disclaimer, the term of this patent is extended or adjusted under 35 U.S.C. 154(b) by 163 days.

(21) Appl. No.: 13/583,716

(22) PCT Filed: Mar. 11, 2010

(86) PCT No.: PCT/EP2010/053086
§ 371 (c)(1),
(2), (4) Date: Nov. 13, 2012

(87) PCT Pub. No.: WO2011/110223
PCT Pub. Date: Sep. 15, 2011

(65) Prior Publication Data
US 2013/0058651 A1    Mar. 7, 2013

(51) Int. Cl.
*H04B 10/60* (2013.01)
*H04Q 11/00* (2006.01)
*H04B 10/69* (2013.01)
*H04J 14/02* (2006.01)

(52) U.S. Cl.
CPC ........... *H04Q 11/0067* (2013.01); *H04B 10/60* (2013.01); *H04B 10/6971* (2013.01); *H04J 14/0227* (2013.01); *H04J 14/0282* (2013.01); *H04J 14/0246* (2013.01); *H04J 14/025* (2013.01); *H04J 14/0252* (2013.01)

(58) Field of Classification Search
CPC . H04B 10/60; H04B 10/6971; H04J 14/0227; H04J 14/0246; H04J 14/025; H04J 14/0282; H04Q 11/0067

USPC ............ 398/58, 163; 370/235, 254; 375/296; 385/135, 37, 43
See application file for complete search history.

(56) References Cited

U.S. PATENT DOCUMENTS

| | | | |
|---|---|---|---|
| 5,144,467 A * | 9/1992 | Kitajima et al. | 398/95 |
| 5,815,295 A * | 9/1998 | Darcie et al. | 398/72 |
| 6,850,710 B1 * | 2/2005 | Mells | 398/163 |
| 7,941,091 B1 * | 5/2011 | Doherty et al. | 455/3.01 |
| 2005/0213977 A1 * | 9/2005 | Ikushima et al. | 398/79 |
| 2008/0085118 A1 * | 4/2008 | Effenberger | 398/82 |
| 2010/0028024 A1 * | 2/2010 | Shpantzer et al. | 398/214 |

OTHER PUBLICATIONS

Rohde, Harald, et al., "Next generation optical access 1 Gbit/s for everyone", ECOC 2009, Piscataway, New Jersey, Sep. 20, 2009, abstract only, 1 pg.

* cited by examiner

*Primary Examiner* — Shi K Li
*Assistant Examiner* — Omar S Ismail
(74) *Attorney, Agent, or Firm* — Nelson Mullins Riley & Scarborough LLP

(57) ABSTRACT

A method for data processing of an optical network element is provided, wherein a configuration information is received at the optical network element and a light signal is adjusted to a wavelength or wavelength range indicated by said configuration information; wherein an incoming optical signal is demodulated via the light signal and mixed as an electrical demodulated signal with a signal of an oscillator; wherein the signal of the oscillator is tuned to improve a reception of the incoming signal at the optical network element; and wherein the light signal is used for upstream modulation to provide a modulated optical upstream signal. Furthermore, an according device and a communication system are suggested including at least one such device.

13 Claims, 4 Drawing Sheets

DATA PROCESSING OF AN OPTICAL NETWORK ELEMENT

The invention relates to a method for data processing of an optical network element as well as to a device. In addition, a communication system is suggested comprising at least one such device.

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

Several PON types have been standardized and are currently being deployed by network service providers worldwide. Conventional PONs distribute downstream traffic from the optical line terminal (OLT) to optical network units (ONUs) in a broadcast manner while the ONUs send upstream data packets multiplexed in time to the OLT. Hence, communication among the ONUs needs to be conveyed through the OLT involving electronic processing such as buffering and/or scheduling, which results in latency and degrades the throughput of the network.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers of around 1550 nm. Dense WDM uses the same transmission window but with denser channel spacing. Channel plans vary, but a typical system may use 40 channels at 100 GHz spacing or 80 channels at 50 GHz spacing. Some technologies are capable of 25 GHz spacing. Amplification options enable the extension of the usable wavelengths to the L-band, more or less doubling these numbers.

Optical access networks, e.g., coherent Ultra-Dense Wavelength Division Multiplex (UDWDM) networks, are deemed to be used as a future data access.

Upstream signals may be combined by using a multiple access protocol, e.g., time division multiple access (TDMA). The OLTs "range" the ONUs in order to provide time slot assignments for upstream communication. Hence, an available data rate is distributed among many subscribers. Therefore, each ONU needs to be capable of processing much higher than average data rates. Such an implementation of an ONU is complex and costly.

Data transmission of spectrally densely spaced wavelengths is utilized by applications such as Next Generation Optical Access (NGOA) systems allowing high data rates of, e.g., 100 Gbit/s.

However, NGOA systems provide symmetric bandwidth in upstream and downstream directions. Hence, NGOA approaches waste a significant amount of resources in case applications mainly utilize an asymmetric bandwidth profile. Such resources wasted in particular comprise: An optical spectrum, a processing capacity of a software radio in an upstream receiver, a packet processing capability in upstream direction, a downstream capacity that cannot be used by other subscribers due to the allocated upstream resources.

On the other hand, the downstream bandwidth of NGOA may be fixed per subscriber, hence bandwidth cannot be dynamically allocated to a specific subscriber for a short period of time.

However, GPON or GEPON are known as applications with an asymmetric bandwidth profile as well as a high overbooking factor. A main disadvantage relates to a ranging procedure and the dynamic bandwidth allocation in upstream direction, which results in transmission delays amounting to 20-100 ms as well as a complex implementation of an according protocol. It is a further disadvantage that the upstream transmitters of the ONUs are switched on and off due to the time-domain multiplexing, resulting in high dynamic requirements at the upstream receiver. As GPON and GEPON do not use heterodyne receivers, the power budget (length, splitting factor) is also limited.

The problem to be solved is to overcome the disadvantages stated above and in particular to provide an efficient approach of an asymmetric NGOA system, which is also compatible with GPON systems.

This problem is solved according to the features of the independent claims. Further embodiments result from the depending claims.

In order to overcome this problem, a method is provided for data processing of an optical network element,
 (a) wherein a configuration information is received at the optical network element and a light signal is adjusted to a wavelength or wavelength range indicated by said configuration information;
 (b) wherein an incoming optical signal is demodulated via the light signal and mixed as an electrical demodulated signal with a signal of an oscillator;
 (c) wherein the signal of the oscillator is tuned to improve a reception of the incoming signal at the optical network element;
 (d) wherein the light signal is used for upstream modulation to provide a modulated optical upstream signal.

The signal of the oscillator may be a frequency, in particular an intermediate frequency. The incoming signal can be demodulated utilizing a light sensor, e.g., a photo diode. The intermediate frequency of the oscillator may adjust the frequency of the demodulated (electrical) signal such that a signal reception at the optical network element, in particular at the output of the mixer, can be achieved or is improved. The optical signal (or the light source emitting said optical signal) has been adjusted as set forth in the configuration information; this setting of the optical signal is used for providing a modulated upstream signal.

This approach can efficiently be used to support symmetrical or asymmetrical optical access systems. The upstream wavelength range can be adjusted to be significantly smaller than the downstream wavelength range. Each optical network element, e.g. ONU, may allocate a reduced wavelength range for upstream communication. This upstream communication is utilized via the light signal that is adjusted accordingly. Hence, the central unit, e.g., an OLT of the optical network, receives all upstream communications from several optical network elements wherein the OLT may broadcast information in downstream direction towards the ONUs. Preferably, the downstream information can be conveyed across a large band width compared with the individual upstream bandwidth utilized by each ONU.

The signal of the oscillator can be tuned or adjusted in order to improve the reception, e.g., the signal quality or a signal-to-noise ratio of the incoming signal. This can be achieved by a known mechanism, e.g., a phase-locked-loop (PLL), a frequency scan, etc.

In an embodiment, the light signal is provided by a light source, in particular a laser.

The light source or the laser may be tunable to a predefined or required wavelength.

In another embodiment, the signal of the oscillator is tuned to substantially compensate the adjustment of the light signal in step (a).

Hence, the light signal is set in step (a) based on the configuration information. This light signal is used for upstream modulation purposes according to step (d). In order to still be able to receive the information that is sent downstream towards the optical network element, the oscillator (or an intermediate frequency provided by said oscillator) can be adjusted. Hence, the signal of the oscillator fed to the mixer (where it is combined with the demodulated electrical (incoming) signal can be used to adjust the signal quality of the downstream information processed at the optical network element (i.e. received at the output of the mixer).

In a further embodiment,
prior to step (a) the signal of the oscillator is set to a predefined or arbitrary frequency and a modulator of the optical network element is disabled;
the light signal is adjusted to improve reception of the incoming signal and to receive the configuration information.

In a next embodiment, after step (b) or after step (c) the modulator is activated.

It is also an embodiment that the bandwidth of the upstream optical signal is lower than the bandwidth of the incoming optical signal.

Pursuant to another embodiment, the configuration information is provided by a central unit, in particular an optical line termination.

Hence, the light signal (in particular light source or laser) can be adjusted accordingly. The assigned bandwidth (wavelength range) for upstream communication can thus be utilized accordingly.

According to an embodiment, the light signal used for upstream modulation is adjusted to a wavelength or wavelength range indicated by said configuration information by improving a signal quality, in particular by reducing a signal-to-noise ratio.

Hence, the adjustment of the light signal, e.g., tuning of a laser or light source, can be done by determining a quality of a signal received. Hence, the light signal can be stepwise adjusted and a signal's quality (e.g., signal-to-noise ratio) can be determined. In case the quality improves, the adjustment can be continued or otherwise reversed. It is noted that several solutions for locking onto a frequency or carrier could be utilized in order to improve the signal quality (e.g., frequency scan, PLL mechanisms or the like).

According to another embodiment, the optical network element is an optical network unit or a subscriber unit of an optical network, in particular a passive optical network.

The problem stated above is also solved by a device
comprising a light source providing a light signal;
comprising a receiver to which the light signal is fed, wherein the receiver provides an electrical output signal;
wherein the light source is adjustable to a wavelength or wavelength range provided by a configuration information received;
comprising an oscillator and a mixer, wherein a signal of the oscillator and the electrical output signal from the receiver are conveyed to the mixer and wherein the signal of the oscillator is tunable to improve a reception of the incoming signal at the device;
comprising a modulator to which the light signal of the light source is fed to provide a modulated optical upstream signal.

According to an embodiment, said device is an optical network element, in particular associated with an optical network unit or a subscriber unit.

According to another embodiment, the signal of the oscillator is tunable to improve a quality, in particular a signal-to-noise ratio of an output signal of the mixer.

Furthermore, the problem stated above is solved by a communication system comprising at least one device as described herein.

The solution suggested in particular provides a single downstream wavelength for a number of n subscribers and a dedicated upstream wavelength for each subscriber. The single downstream wavelength can be utilized to broadcast information to said n subscribers.

Each ONU may comprise a heterodyne receiver. However, in contrast to known NGOA receivers, each ONU connected to the PON may use a different intermediate frequency (IF). This allows each ONU to use the local oscillator frequency of its heterodyne receiver as a transmitting frequency (or wavelength) in upstream direction.

For example, a downstream bandwidth of an optical communication system can be set to 1 Gbit/s, which is used for all subscribers or ONUS attached to the PON or a portion thereof. In addition, each subscriber can be assigned an upstream bandwidth of a reduced bandwidth, amounting, e.g., to 100 Mbit/s. Intermediate frequencies of different ONUs 1 to 31 may amount to: 1.5 GHz, 1.7 GHz, 1.9 GHz, . . . , 7.7 GHz.

Figure 1:
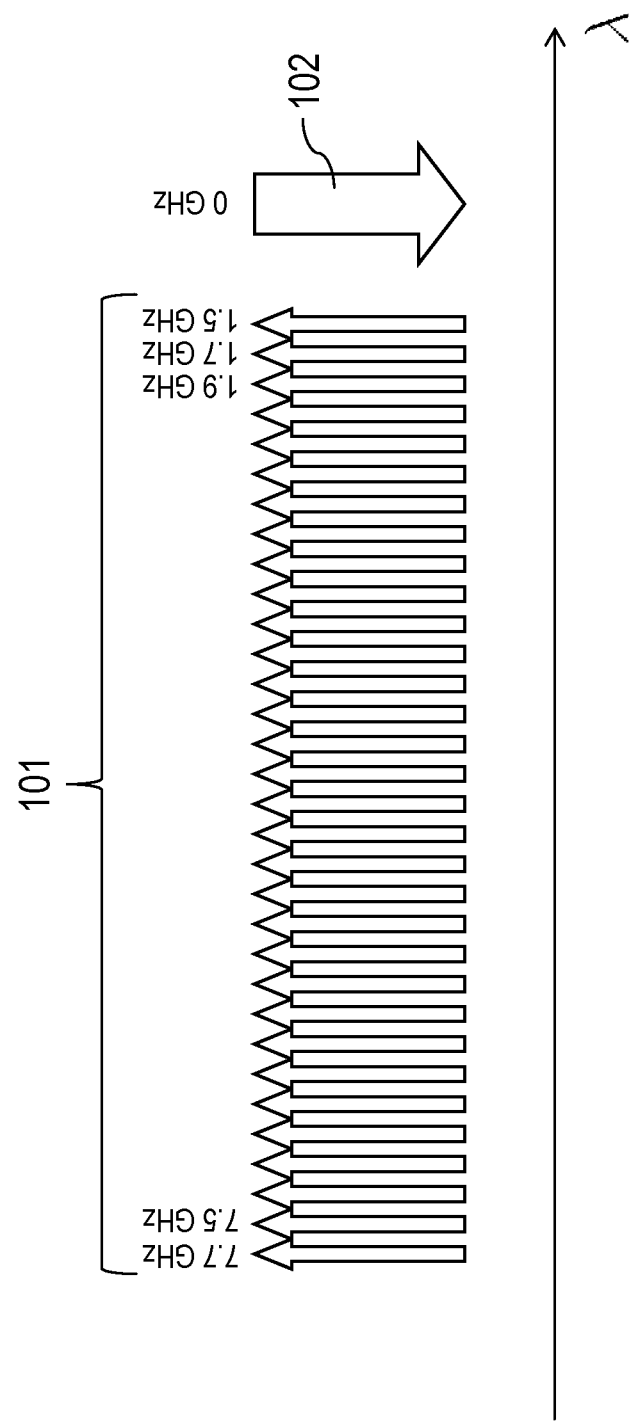
FIG. 1 shows a wavelength plan comprising several upstream wavelengths and a broad downstream wavelength.

FIG. 1 shows a wavelength plan comprising several upstream wavelengths 101 and a broad downstream wavelength 102.

The approach suggested can be used in combination with different bandwidth ranges, different data rates in downstream and/or upstream direction, various splitting factors and/or different intermediate frequencies.

As an option, the upstream wavelengths may be provided in the spectrum at both sides of the downstream wavelength.

Exemplary ONU Implementation

Figure 2:
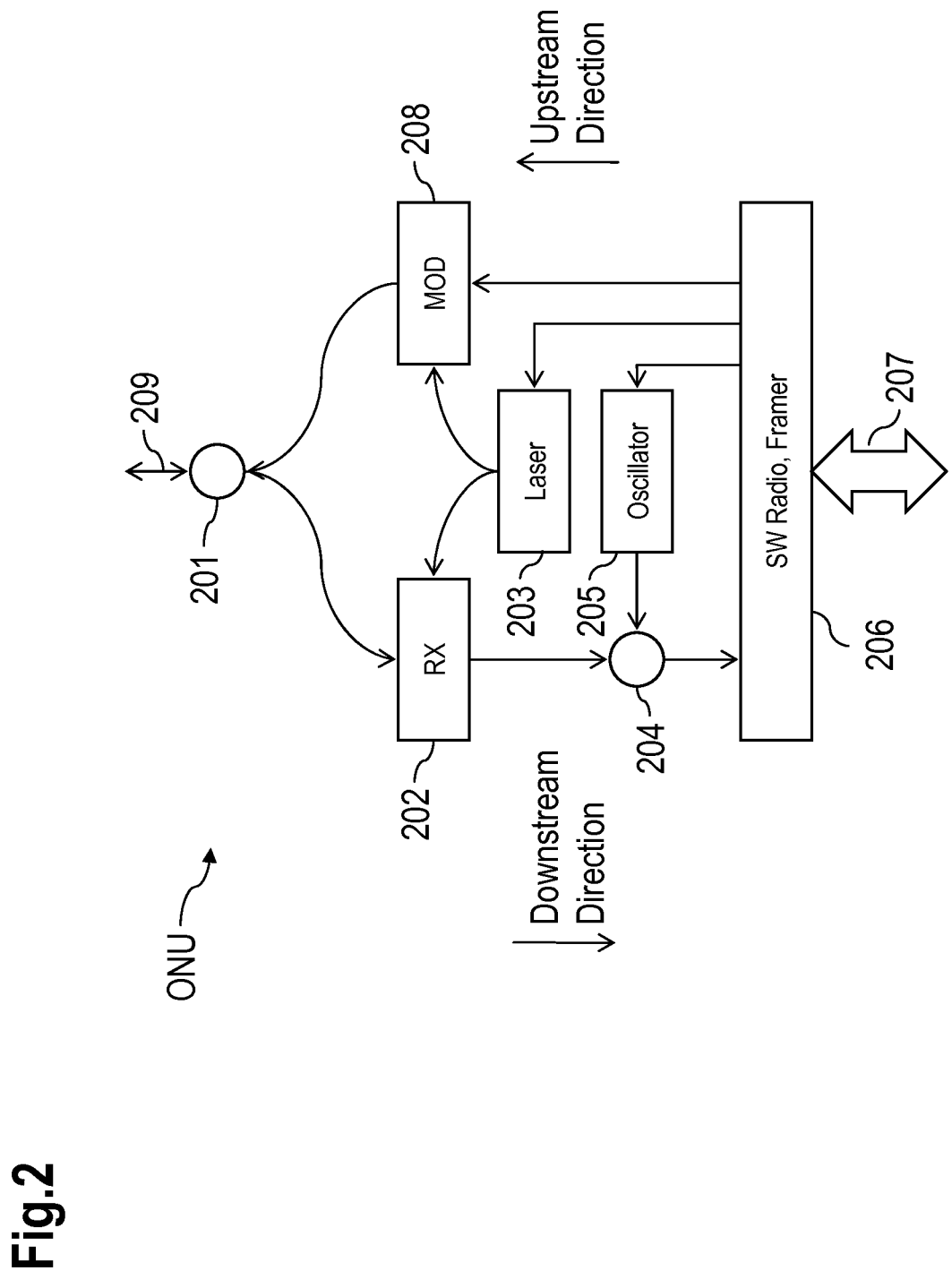
FIG. 2 shows an exemplary block structure visualizing an implementation of an ONU according to the solution described herein.

FIG. 2 shows an exemplary block structure visualizing an implementation of an ONU according to the solution described herein.

An optical signal from a fiber 209 arrives at a splitter 201 of the ONU and is forwarded to an optical receiver 202 comprising a photo diode, said optical receiver 202 utilizing a signal from a tunable laser 203 (also referred to as local oscillator) and the output of the optical receiver 202 is conveyed to a unit 204 where it is mixed with an intermediate frequency IF provided by an oscillator 205 (also referred to as IF-oscillator). This mixed output signal of the unit 204 is fed to a software radio and framer 206, which may process the data received via an Ethernet connection 207.

In upstream direction, the ONU may receive data from the Ethernet connection 207, process it in the software radio and framer 206 and convey the processed data to an optical modulator 208, which is driven by the tunable laser 203. The modulated optical signal is conveyed via the splitter 201 onto the fiber 209 that is connected to the ONU.

The oscillator 205 can be adjusted by the software radio and frame 206 such that it provides an intermediate frequency that allows receiving the downstream signal with a configurable offset of the tunable laser 203. Such configuration can be utilized to assign every ONU in the PON a different upstream wavelength, which will be explained hereinafter.

Exemplary OLT Implementation

Figure 3:
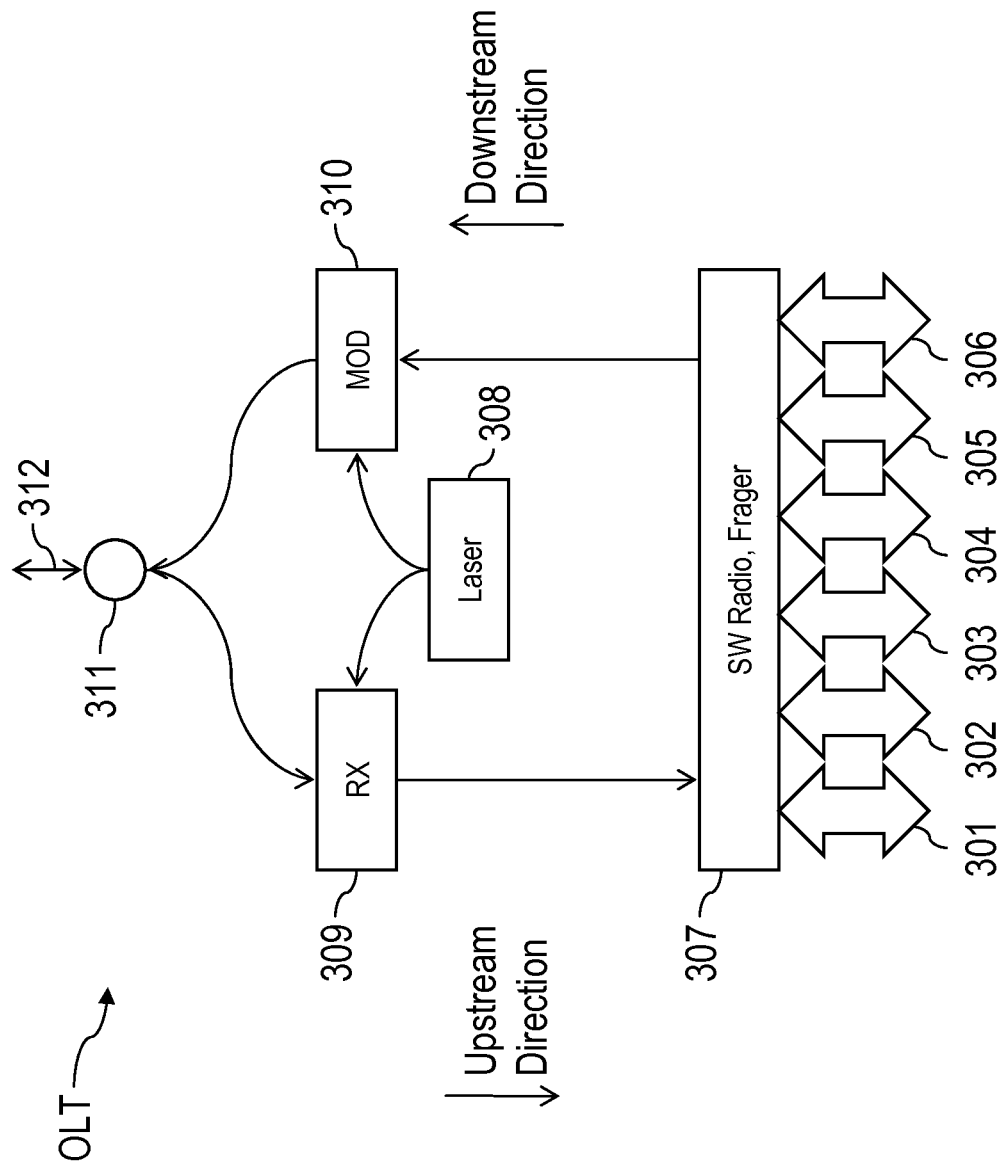
FIG. 3 shows an exemplary block structure visualizing an implementation of an OLT.

FIG. 3 shows an exemplary block structure visualizing an implementation of an OLT.

Several Ethernet connections 301 to 306 are connected to a software radio and framer 307, which in downstream direction is connected to an optical modulator 310 which uses an optical signal from a laser 308 to convey a modulated optical signal towards a splitter 311 onto a fiber 312.

In upstream direction, the optical signal is fed from the splitter 311 to an optical receiver 309 (comprising, e.g., a photo diode), which uses the signal from the laser 308 for demodulating the optical signal (into an electrical signal) and conveys the demodulated (electrical) signal via the software radio and framer 307 towards the Ethernet 301 to 306.

The laser 308 of the OLT does not have to be a tunable laser. At the electrical side of the optical receiver 309, the complete intermediate frequency spectrum of all ONUS is visible and can be digitized and processed by the software radio and framer 307.

Protocol Layer

The communication protocol utilized may be based on the GPON TC layer. No upstream bandwidth allocation scheme is needed, because every subscriber (ONU) has a dedicated wavelength. Hence, all subscribers can send upstream traffic simultaneously without any TDM scheme.

Figure 4:
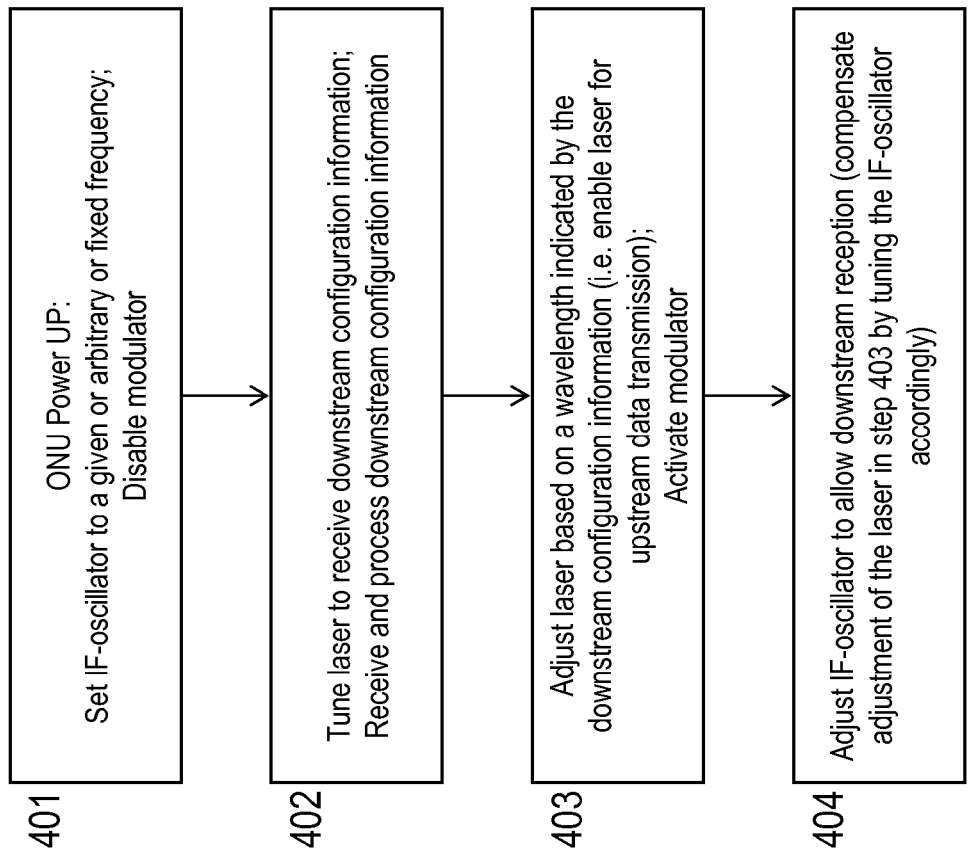
FIG. 4 shows a schematic flow diagram comprising steps to be conducted at the ONU in order to allow for an efficient asymmetric NGOA system.

FIG. 4 shows a schematic flow diagram comprising the steps to be conducted at the ONU in order to allow for an efficient asymmetric NGOA system.

In downstream direction, the OLT may assign each ONU a unique intermediate frequency (IF). After being powered up (see step 401), the respective ONU (see FIG. 2) sets its IF-oscillator 205 to a predetermined, fixed or arbitrary value and disables its optical modulator 208 to avoid sending any light in upstream direction.

The ONU searches for the downstream wavelength and adjusts its laser 203 accordingly to be able to receive configuration parameters conveyed via the downstream signal provided by the OLT (see step 402).

Based on such configuration parameters obtained, the ONU adjusts its laser 203 to an upstream wavelength that can be utilized by this particular ONU. The ONU's modulator is activated (see step 403).

Pursuant to this adjustment of the laser 203, the oscillator 205 is re-adjusted, e.g., by the software radio and frame 206, in order to ensure reception and further processing of the downstream signal. Hence, the oscillator 205 compensates the previous adjustment of the laser 203 (see step 404).

The laser 203 is used for modulation purposes in upstream direction (by feeding its signal to the modulator 208) as well as for demodulation purposes in downstream direction (by feeding its signal to the receiver 202).

Further Advantages

The solution suggested offers the same downstream overbooking mechanism as does a GPON or a GEPON and combines it with the heterodyne receivers of NGOA thereby significantly increasing the power budget of the GPON or GEPON.

Also, the solution avoids any problems and complications known from upstream bandwidth allocation schemes utilized in GPON or GEPON.

It is noted that the same ONU can be used for symmetrical NGOA as well as for asymmetrical NGOA.

This approach advantageously allows for significantly reducing hardware complexity and thus costs compared to an OLT used in a symmetrical NGOA.

The approach further enables an asymmetrical NGOA that combines n subscribers in a shared tree with high bandwidth efficiency in the optical domain; all receivers may be frequency selective. Therefore, multiple asymmetrical NGOA trees can be combined in a single fiber and/or PON, extending the number of subscribers by an order of magnitude compared to symmetrical NGOA.

It is further possible to combine symmetrical NGOA and asymmetrical NGOA in the same hardware of an ONU and/or an OLT.

In the same PON, a service provider can combine subscribers with dedicated downstream bandwidth (symmetrical NGOA) and a shared downstream bandwidth (asymmetrical NGOA) according to the approach presented herein.

GPON and/or GEPON ONUs could be used in the same PON, using the same downstream signal, as the upstream signal can be deployed in the 1310 nm range and does not interfere with the NGOA signals. Hence, this solution can be used having both GPON and/or GEPON with the same downstream signal as NGOA.

List of Abbreviations:
GEPON Gigabit Ethernet PON
GPON Gigabit PON
IF Intermediate Frequency
NGOA Next Generation Optical Access
OLT Optical Line Termination
ONU Optical Network Unit
PD Photo Diode
PON Passive Optical Network
TC Transmission Convergence
TDM Time Division Multiplexing
UDWDM Ultra Dense WDM

The invention claimed is:

1. A method for data processing of an optical network element,
   (a) wherein a configuration information is received at the optical network element and a light signal is adjusted to a wavelength or wavelength range indicated by said configuration information;
   (b) wherein an incoming optical signal is demodulated via the light signal and mixed as an electrical demodulated signal with a signal of an oscillator;
   (c) wherein the signal of the oscillator is tuned to improve a reception of the incoming signal at the optical network element;
   (d) wherein the light signal is used for upstream modulation to provide a modulated optical upstream signal.

2. The method according to claim 1, wherein the light signal is provided by a light source, in particular a laser.

3. The method according to claim 1, wherein the signal of the oscillator is tuned to substantially compensate the adjustment of the light signal in step (a).

4. The method according to claim 1,
   wherein prior to step (a) the signal of the oscillator is set to a predefined or arbitrary frequency and a modulator of the optical network element is disabled;
   wherein the light signal is adjusted to improve reception of the incoming signal and to receive the configuration information.

5. The method according to claim 4, wherein after step (b) or after step (c) the modulator is activated.

6. The method according to claim 1, wherein the bandwidth of the upstream optical signal is lower than the bandwidth of the incoming optical signal.

7. The method according to claim 1, wherein the configuration information is provided by a central unit, in particular an optical line termination.

8. The method according to claim 1, wherein the light signal used for upstream modulation is adjusted to a wavelength or wavelength range indicated by said configuration information by improving a signal quality, in particular by reducing a signal-to-noise ratio.

9. The method according to claim 1, wherein the optical network element is an optical network unit or a subscriber unit of an optical network, in particular a passive optical network.

10. A device
  comprising a light source providing a light signal;
  comprising a receiver to which the light signal is fed, wherein the receiver provides an electrical output signal; wherein the light source is adjustable to a wavelength or wavelength range provided by a configuration information received;
  comprising an oscillator and a mixer, wherein a signal of the oscillator and the electrical output signal from the receiver are conveyed to the mixer and wherein the signal of the oscillator is tunable to improve a reception of the incoming signal at the device;
  comprising a modulator to which the light signal of the light source is fed to provide a modulated optical upstream signal.

11. The device according to claim 10, wherein said device is an optical network element, in particular associated with an optical network unit or a subscriber unit.

12. The device according to claim 10, wherein the signal of the oscillator is tunable to improve a quality, in particular a signal-to-noise ratio of an output signal of the mixer.

13. A communication system comprising at least one device according to claim 10.

* * * * *